US 6,561,686 B1

United States Patent
Neubauer

(10) Patent No.: US 6,561,686 B1
(45) Date of Patent: May 13, 2003

(54) VEHICLE LIGHT MOUNT

(76) Inventor: Jeffrey D. Neubauer, 105 NW. 147th St., Vancouver, WA (US) 98685

( * ) Notice: Subject to any disclaimer, the term of this patent is extended or adjusted under 35 U.S.C. 154(b) by 0 days.

(21) Appl. No.: 10/100,237

(22) Filed: Mar. 19, 2002

(51) Int. Cl.[7] .................................................. B60Q 1/56
(52) U.S. Cl. ....................... 362/497; 362/249; 362/505
(58) Field of Search .................................. 362/496, 497, 362/234, 253, 249, 367, 368, 504, 505, 506; 40/204, 205, 206

(56) References Cited

U.S. PATENT DOCUMENTS

| | | | | |
|---|---|---|---|---|
| 1,424,679 A | * | 8/1922 | Ridenour | 40/202 |
| 1,529,074 A | * | 3/1925 | Link | 362/507 |
| 1,737,858 A | * | 12/1929 | Martin | 248/300 |
| 2,239,015 A | | 4/1941 | Powell | |
| 2,269,822 A | | 1/1942 | Kowalsky | |
| 2,430,232 A | * | 11/1947 | Lynch | 40/543 |
| 3,590,236 A | | 6/1971 | Ussery | |
| 4,357,650 A | * | 11/1982 | Kano | 362/497 |
| 5,845,983 A | | 12/1998 | Schmidt | |

* cited by examiner

*Primary Examiner*—Sandra O'Shea
*Assistant Examiner*—John Anthony Ward
(74) *Attorney, Agent, or Firm*—Edward A. Sokolski

(57) ABSTRACT

A mount for mounting vehicle lights below and forward of the conventional vehicle headlights. The mount has a central portion which forms a license plate mount and a pair of wing portions which extend outwardly in opposite directions from the bottom of the central portion. The central portion is attached to the bumper of the vehicle. The wing portions run over the top of the bumper. A light is mounted on each of the wing portions providing illumination close to the road which greatly improves visibility especially in low visibility conditions such as in rain or fog.

5 Claims, 1 Drawing Sheet

VEHICLE LIGHT MOUNT

BACKGROUND OF THE INVENTION

1. Field of the Invention

This invention relates to vehicle lights and more particularly to a device for mounting additional lights on a vehicle below and forward of the regular vehicle lights.

2. Description of the Related Art

Vehicle driving lights forward of and below the regular headlights are frequently added to passenger and commercial type vehicles to supplement the vehicle's regular headlights. This is particularly useful when driving on dark unlighted roads at night or in other low visibility situations such as in fog or rain. Such lights are generally mounted forward of and below the regular lights so that they are closer to the road and thus provide a better view of the road. Prior art systems for mounting such lights are described in U.S. Pat. No. 5,845,983 issued Dec. 8, 1998 to Schmidt and U.S. Pat. No. 2,239,015 issued Apr. 22, 1941 to Powell. In the Powell device, the lights are mounted directly on the bumper while in Schmidt a tube on which the lights are mounted has downward extending end pieces which are attached as their ends to the bumper.

SUMMARY OF THE INVENTION

The device of the present invention provides an improvement over the prior art by combining the mount for the lights with the license plate holder. The license plate holder is fabricated of strong central flat plate which is firmly attached to the bumper. A pair of arms extend outwardly in opposite directions from the base of the central plate. A light is mounted on each of the arms. The lights are thus firmly supported on the bumper by means of the mount with the central flat plate being firmly attached to the bumper and forming a support for the license plate.

It is therefore an object of this invention to provide an improved mount for supplemental vehicle lights.

It is a further object of this invention to provide a mount for supplemental vehicle lights which also provides a license plate support;

It is still a further object of this invention to provide a mount for supplemental vehicle lights which has stronger support than prior art devices.

Other objects of the invention will become apparent from the following description in conjunction with the accompanying drawings.

DETAILED DESCRIPTION OF THE INVENTION

Figure 1:
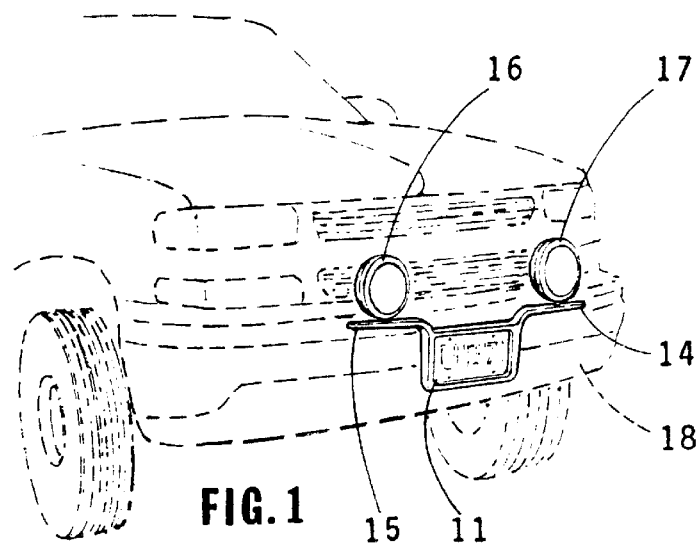
FIG. 1 is a front perspective view of a preferred embodiment of the invention shown attached to the bumper of a vehicle.
Figure 2:
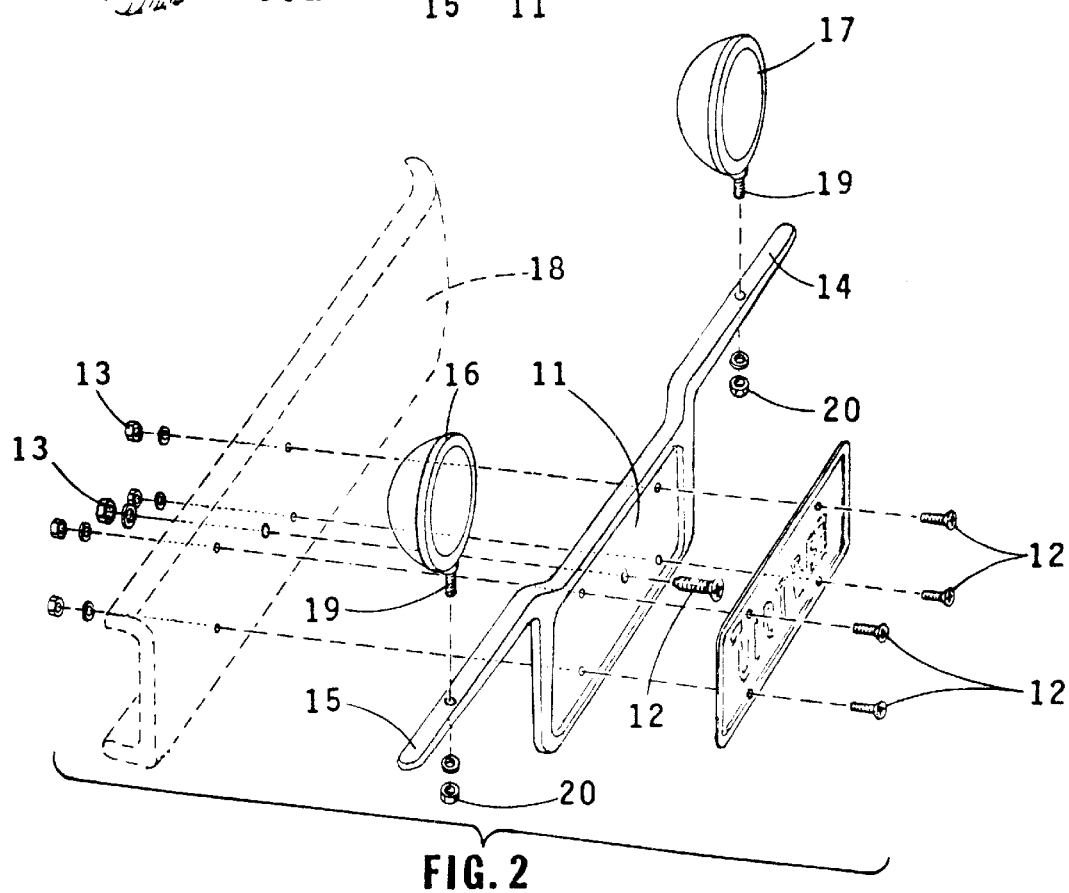
FIG. 2 is an exploded view of the preferred embodiment.

Referring to the Figures, the mount of the invention includes a central portion 11 which is formed by a plate 11 which is of high strength. This central portion is firmly attached to the bumper 13 of the vehicle by means of bolts 12 and nuts 13. Plate 11 is of the size and shape of a typical license plate and is used as a mount for such a plate.

A pair of arm or wing portions 14 and 15 extend outwardly in opposite directions substantially at right angles from the sides of the plate 11. Attached to each of these arms by means of bolts and screws 19 and 20 is a light 16 and 17.

The lights thus are supported beneath the regular vehicle headlights closer to the road to provide extra illumination when visibility is low.

While the device has been described and illustrated in detail, this is intended by way of illustration and example only and not by way of limitation, the spirit and scope of the invention being limited only by the terms of the following claims.

I claim:

1. A device mounted on the bumper of a vehicle for supporting at least a pair of lights comprising:
   a central portion formed by a plate having an area sufficient to support a vehicle license plate;
   means for firmly attaching said central portion to the vehicle bumper;
   a pair of side wing portions extending outwardwardly in opposite directions from the opposite sides of said central portion;
   at least one of said lights being mounted on each of said side wing portions.

2. The device of claim 1 wherein said means for firmly attaching said central plate portion to said bumper comprises bolts and nuts.

3. The device of claim 1 wherein said wing portions extend outwardly from the bottom of the sides of said said plate portion.

4. The device of claim 1 wherein said plate of said central portion is substantially flat.

5. The device of claim 1 wherein one of said lights is mounted on each of said wing portions.

* * * * *